United States Patent [19]
Lazzaro

[11] Patent Number: 5,422,527
[45] Date of Patent: Jun. 6, 1995

[54] X-RAY TUBE TARGET DRIVE ROTOR

[75] Inventor: Jamie E. Lazzaro, Wauwatosa, Wis.

[73] Assignee: General Electric Company, Milwaukee, Wis.

[21] Appl. No.: 271,607

[22] Filed: Jul. 7, 1994

[51] Int. Cl.$^6$ ............................................. H02K 3/06
[52] U.S. Cl. ..................................... 310/211; 310/265
[58] Field of Search .............. 310/211, 261, 312, 267, 310/264, 265

[56] References Cited

U.S. PATENT DOCUMENTS

| | | | |
|---|---|---|---|
| 1,375,461 | 4/1921 | Kimble | 310/211 |
| 4,211,946 | 7/1980 | Eckert et al. | 310/212 |
| 4,453,101 | 6/1984 | Nelson | 310/211 |
| 5,185,918 | 2/1993 | Shafer, Jr. | 310/211 X |

FOREIGN PATENT DOCUMENTS

| | | | |
|---|---|---|---|
| 526436 | 2/1954 | France | 310/211 |
| 5-64401A | 3/1993 | Japan | 310/211 |

Primary Examiner—Mary O. Budd
Attorney, Agent, or Firm—James J. Lichiello; John H. Pilarski

[57] ABSTRACT

An induction motor rotor unit adapted to support and rotate an X-ray target anode in an X-ray tube comprises a stacked array of very thin highly magnetic annular laminations on a cylindrical carrier. Gold plated copper conductor bars are placed in longitudinal coaxial slots in the circumference of the rotor. Gold plated end rings on the carrier abut each end of the stacked array and conductor bars. In a vacuum furnace the gold plating is caused to melt and diffuse into contiguous components to bond the rotor as an integral unit.

5 Claims, 2 Drawing Sheets

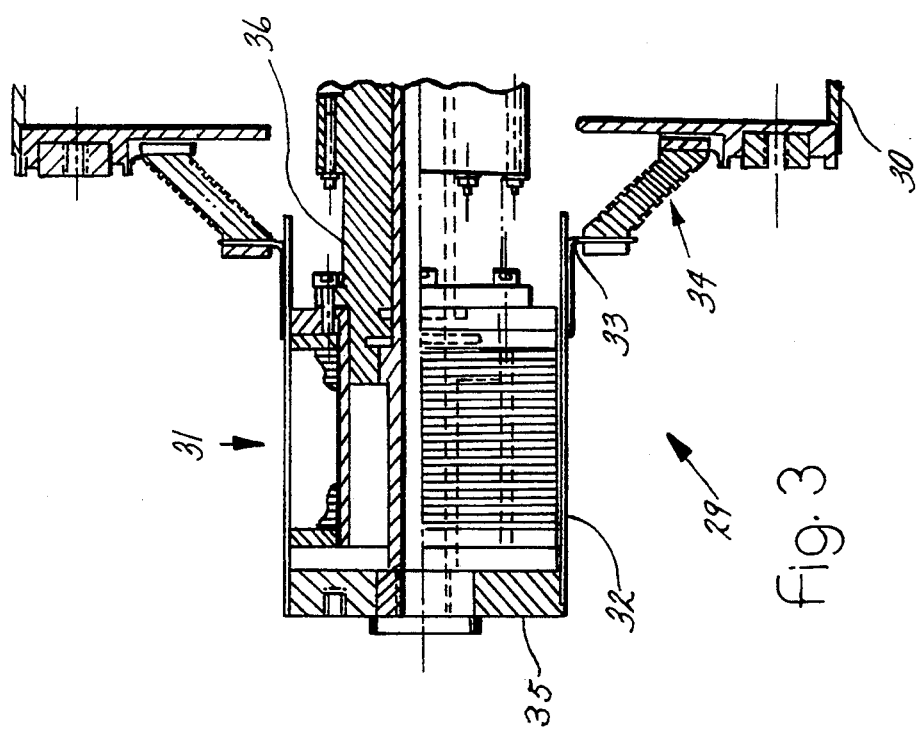
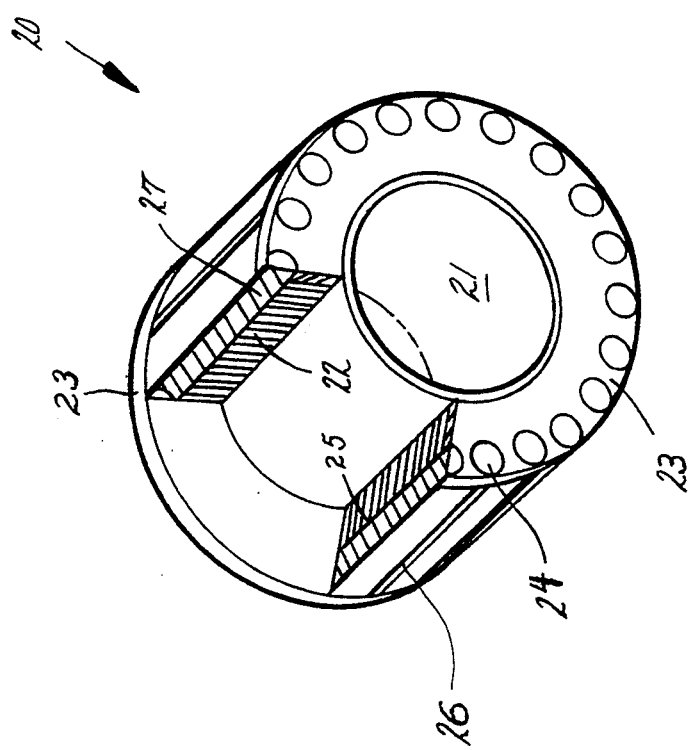

X-RAY TUBE TARGET DRIVE ROTOR

BACKGROUND OF THE INVENTION

This invention relates to an X-ray tube rotating target drive rotor and more particularly to an electric induction motor rotor in the tube on which a target anode disc is mounted for rotation.

Ordinarily an X-ray beam generating device, referred to as an X-ray tube, comprises spaced dual electrodes of an electric circuit in an evacuated chamber or tube. One of the electrodes is a thermionic emitter cathode electrode which is mounted in the tube in spaced apart relationship to a target or anode electrode. The cathode is electrically resistance heated to generate a stream of electrons directed towards the anode target. The electron stream is appropriately focussed as a thin beam of very high velocity electrons striking the target. The target utilizes a striking surface of a predetermined material (usually comprising a refractory metal) so that the kinetic energy of the striking electrons against the target material is converted into electromagnetic waves of very high frequency, i.e. X-rays, which project from the target to be appropriately collimated and focussed for penetration into an object for interior analysis or examination purposes, for example, a human medical diagnostic procedure. The high velocity beam of electrons striking the target surface generates extremely high and localized temperatures deleterious to the target material and structure. As a consequence it has become a practice to utilize a rotating disk-like target. By means of a rotating target, the electron striking region of the target is continuously changing to avoid localized heat concentration and better distribute the heating effects throughout the target structure. Target rotational speeds in excess of 10,000 RPM are not unusual.

One example of drive means employed to rotate an X-ray tube target anode comprises mounting an electric induction motor armature or rotor for coaxial rotation in a necked down section of an evacuated glass X-ray tube. The electric motor field windings closely and coaxially surround the necked down section of the tube to act on the concentric rotor in accordance with well known electric motor principles to cause rotation of the rotor. The target disc is coaxially mounted on the rotor to be exposed to the thermionic emitter cathode.

Increases in X-ray generating capabilities with resultant larger X-ray tubes and larger targets has lead to the need for a more effective electric motor drive to provide increased starting and running torque for the target.

Accordingly, it is an object of this invention to provide an improved electric induction motor rotor for electric motor drive means of rotating targets in X-ray tubes.

SUMMARY OF THE INVENTION

An induction motor rotor structure comprises a concentric stacked array of very thin highly magnetic annular discs on a hollow cylindrical carrier. Each disc has a row of open circle apertures adjacent to its periphery with the open part of the circle on the periphery so that when the discs are placed on the carrier with their apertures in registry the stacked array defines a circumferential row of longitudinal and coaxial slots its circumference. Thick wall gold plated copper end plate rings also having a peripheral row of apertures adjacent their periphery are placed on the carrier at each end of the stacked array of laminations in planar abutting relationship to the stacked array of laminations and with the plate ring apertures in registry with those of the laminations. Gold plated copper rods or bars are inserted into the apertures in the end plate rings to project through the defined longitudinal and axial slots in the shacked array of laminations. The assembled structure is placed in a vacuum furnace to provide melting of the gold plating and gold diffusion bonding of the assembled electric motor rotor structure into an integral unit.

This invention will be better understood when taken connection with the following drawings and description.

BRIEF DESCRIPTION OF THE DRAWINGS

FIG. 2 is a schematic and cross-sectional illustration of a rotating target rotor structure of the present invention.

FIG. 3 is a cross-sectional illustration of a necked down section of a larger X-ray tube with the rotor of this invention therein.

DESCRIPTION OF A PREFERRED EMBODIMENT

Figure 1:
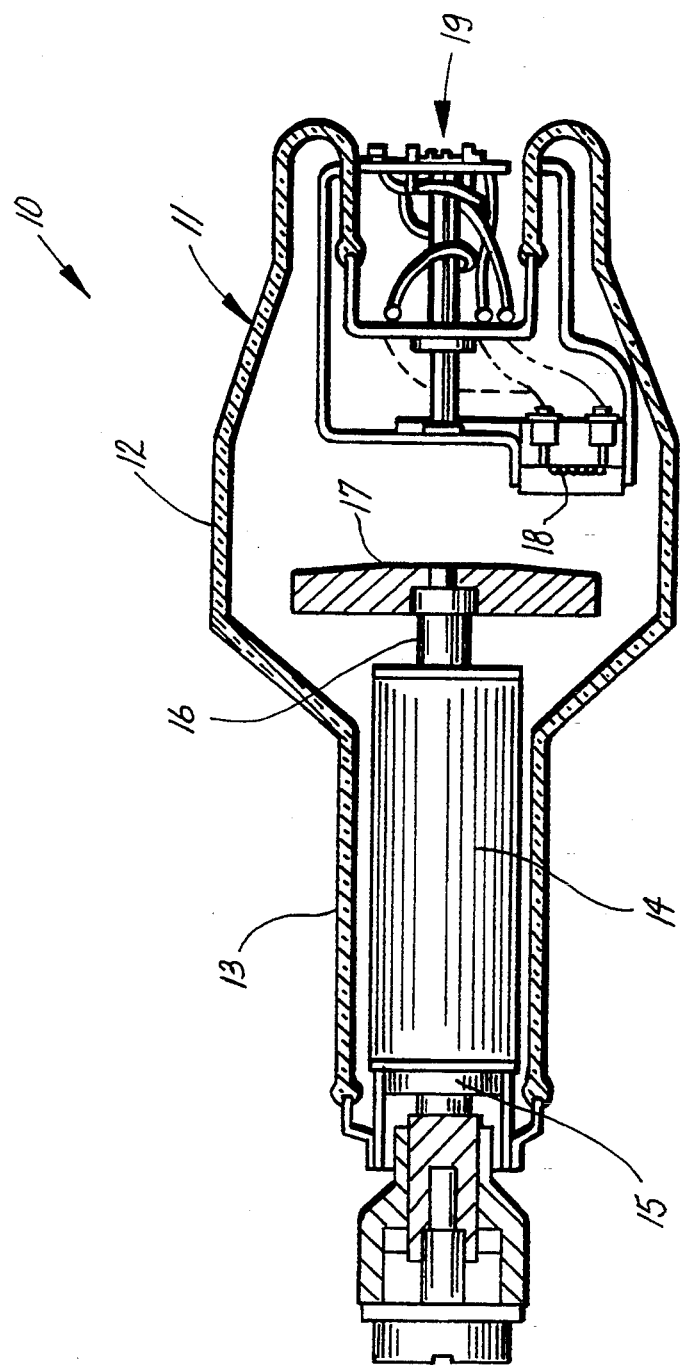
FIG. 1 is a cross-sectional illustration of an X-ray tube with a rotor mounted and driven rotating target.

X-ray tube components and their arrangement are best described with respect to FIG. 1.

Referring now to FIG. 1, X-ray tube 10 comprises an evacuated glass tube structure 11 having an enlarged section 12 and a necked down section 13. Within the necked down section 13 an electric motor rotor 14 is mounted in a bearing assembly 15 for coaxial rotation in section 13. An electric motor stator or field winding (not shown) coaxially surrounds necked down section 13 and rotor 14 in the usual manner so that electrical energization of the field windings causes rotor 14 to rotate as an induction motor rotor. A shaft 16 extends into the enlarged section 12 of tube 11 and a target anode 17 is mounted on shaft 16 for rotation therewith. Axially spaced from target 17 is a thermionic emitter cathode 18 together with appropriate electrical connections generally indicated at 19 for electrical connection to a source of power (not shown). Energization of emitter 18 which usually includes an electron focussing means provides a stream or beam of high velocity electrons directed to strike target 17 in the usual manner for X-ray generation. In this connection, rotation of target 17 is extremely important to ameliorate the very high temperatures generated in the target by electron impingement. Larger targets of increased mass require additional torque capabilities from rotor 14 to reach and sustain the desired rotational speed in an optimum period of time.

A much improved high torque rotor for larger X-ray tube applications is illustrated in FIG. 2.

Referring now to FIG. 2, high torque rotor 20 comprises a base structure of a hollow metal cylindrical carrier 21, Mounted concentrically on carrier 21 are a plurality of thin highly magnetic annular laminations 22 in a stacked array between a pair of annular end plates or rings 23 on carrier 21 in abutting relationship to the stacked array of laminations 22. Each end plate 23 includes a circular row of apertures 24 closely adjacent the ring periphery. Each lamination also includes a coincident row of similar apertures to those in rings 23 and, in the stacked array of laminations in registry relationship, the lamination apertures define a circular channel 25 passing coaxially through end plates 23 and the stacked array.

Laminations 22 are formed from a highly magnetic material which, in one practice of this invention was an alloy comprising 49% iron (Fe), 49% cobalt (Co) and the balance vanadium (Va) with thicknesses in the range of 0.025 to 0.030 inch. Other highly magnetic alloys may contain such metals as platinum (Pl), other amounts of cobalt (Co), as well as some rare earth metals. Laminations 22 are generally related to those laminations which make up rotors and stators of electrical machinery and are stamped or punched from thin sheet steel stock. A punching operation is also used to punch out small peripheral sections of the laminations so that electrical conductor or coil grooves or slots are provided on the periphery of a stacked array of such laminations as a rotor or stator to retain electrical coils or conductors therein. In the present invention, the lamination apertures which make up channel 25 are open circle or semi closed apertures with the open part of the circle on the periphery of the laminations. As a consequence, in the stacked array of laminations as illustrated in FIG. 2, the adjacent open circle parts of the channel 25 apertures define a longitudinal slot opening 26 for each channel 25. Copper bars or rods 27 pass through end plates 23 and through channels 25 to serve as electrical conductor bars for the induction motor rotor 20. Copper bars 27 as well as end rings 23 are previously coated or plated with a good bonding material of enhanced electrical conductivity equal to or greater than that of copper. Included among such materials are metals such as gold (Au), silver (Ag) and materials and alloys including such metals. One particular metal meeting these requirements and utilized in a practice of this invention is gold (Au). In one practice of this invention, the noted laminations and end ring components are assembled on a type 300 stainless stell carrier 21 as a rotor 20 of FIG. 2.

Thereafter, the assembled structure is placed in an evacuated chamber at a pressure of about $10^{-5}$ Torr. and subjected to an elevated temperature of about 1070° C. for about 3-6 minutes. This procedure causes the gold plating on the components to become molten and diffuse into contiguous components for gold diffusion bonding of rotor 20 as an integral and unitary structure. The bonding process is carried on at a temperature of about 1070° which is greater than the operating temperature of the rotor in an X-ray tube. These circumstances represent a beneficial advantage to the rotor of this invention in that it provides a degree of temperature and outgassing conditioning of the rotor, e.g. some stress relief in the structure and its components as well as some outgassing from the high temperature low pressure environment. Outgassing has been observed by some increase in the pressure in the evacuated chamber during the bonding procedure. Thereafter, rotor 20 is placed in a metalworking machine such as a lathe and the outside diameter of rings 23 machined to a predetermined dimension. This machining procedure provides a precision diameter for rotor 21 with a predetermined exposure of copper conductors 27 at the rotor periphery. More specifically rotor 20 of this invention provides a row of conductor bars or rods 27 closely adjacent the periphery of the rotor for an advantageous minimal air gap between the conductor bars and the surrounding stator of the induction motor. The speed-torque characteristics of the rotor may be varied by changing the cross-sectional area of slots 26 and their conductors 27. In one practice of this invention the exposed copper at each slot 26 was about 0.053 inch in circumferential width with the exposed copper surface near coincident with the periphery of the stacked array of laminations 22.

All materials of rotor 20 are selected to be those less likely to absorb or occlude gases so that the necessary outgassing procedure for X-ray tubes is not unduly time consuming, and gases which deleteriously affect X-ray generation are not released during the usual temperatures and pressures of X-ray tube operation.

Some larger X-ray tubes are assembled from metal subassemblies or sections while retaining the general structure and arrangement as described for FIG. 1. In such an instance a similar necked down section may comprise a closed end thin wall metal cylinder in which the rotor 20 of this invention is concentrically mounted for rotation of an attached target. An illustration of this metal necked down section is given in FIG. 3.

Referring now to FIG. 3 an X-ray tube 29 includes a larger section 30 and a neck section 31. Neck section 31 comprises a thin wall metal cylinder 32 coaxially joined to a circular flange 33. Flange 33 is part of a frustrum-like transition piece 34 connecting neck section 31 to larger section 30 of tube 29. A circular back plate member 35 fits in and closes off the extended end of cylinder 32. Rotor 20 of this invention is coaxially positioned in cylinder 32 and fixed to a shaft means 36 which extends into larger section 30 of tube 29. An induction motor stator or field windings (not shown) closely surround neck section 31 and when electrically energized, cause rotation of rotor 20. Operation of rotor 20 of this invention is more effective with thinner metals for cylinder 32. A thinner metal for cylinder 32 together with a strong stator field and a highly responsive rotor 20 of this invention provides the kind of high torque from rotor 20 required for X-ray targets of increased mass. Cylinder 32 may be of a magnetic or non-magnetic material. In one practice of this invention cylinder 32 was formed of an alloy of iron (Fe), nickel (Ni) and chromium (Cr) referred to as Inconel metal and about 0.020 in. thickness.

The assembly and bonding process of rotor 20 includes selecting key components to be gold plated, assembling the components into a complete structure and then subjecting the structure to an elevated temperature and low pressure for gold diffusion bonding of the key components to other contiguous components. The process provides an integral and highly electrically effective high torque induction motor rotor for low pressure or vacuum applications, particularly in that the bonding process is carried out at a temperature in excess of the usual operating temperatures of the X-ray tube in which it is to be employed, and at a pressure or vacuum less than that in the X-ray tube in which it is to be employed. This invention provides a highly effective induction motor rotor particularly adaptable for elevated temperature, low pressure or vacuum operating conditions. The described structure also provides for operation with a reduced clearance gap to the stator or field coils of the motor.

While this invention has been disclosed and described with respect to a preferred embodiment, it will be understood by those skilled in this art that various changes and modifications may be made without departing from the spirit and scope of the invention.

What is claimed is:

1. An electrical induction motor rotor particularly adapted for use in an evacuated chamber comprising in combination
   (a) a hollow cylindrical carrier member,
   (b) a plurality of thin highly magnetic annular disc laminations positioned concentrically on said carrier in a contiguous stacked array,
   (c) each of said laminations having a peripheral row of open circle apertures adjacent its periphery with all laminations in said stacked array having their open circle apertures in registry relationship to provide a peripheral row of coaxial and longitudinal channels in the periphery of said stacked array,
   (d) a copper rod coated with an enhanced electrical conductive and bonding material in each of said channels,
   (e) and an annular copper end ring coated with an enhanced electrical conductive and bonding material concentrically fitted on said carrier at each end of said stacked array in planar abutting relationship thereto,
   (f) said end rings having a peripheral row of apertures therein in registry with said channels in said stacked array to receive the ends of said copper rods therein.

2. The invention as recited in claim 1 wherein said material comprises a metal.

3. The invention as recited in claim 1 wherein said material joins said copper rods to said end rings and said laminations, and said end rings to said carrier.

4. The invention as recited in claim 1 wherein said material comprises gold (Au).

5. The invention as recited in claim 1 wherein said carrier is a chromium (Cr) iron (Fe) alloy material.

* * * * *